Figure 1:
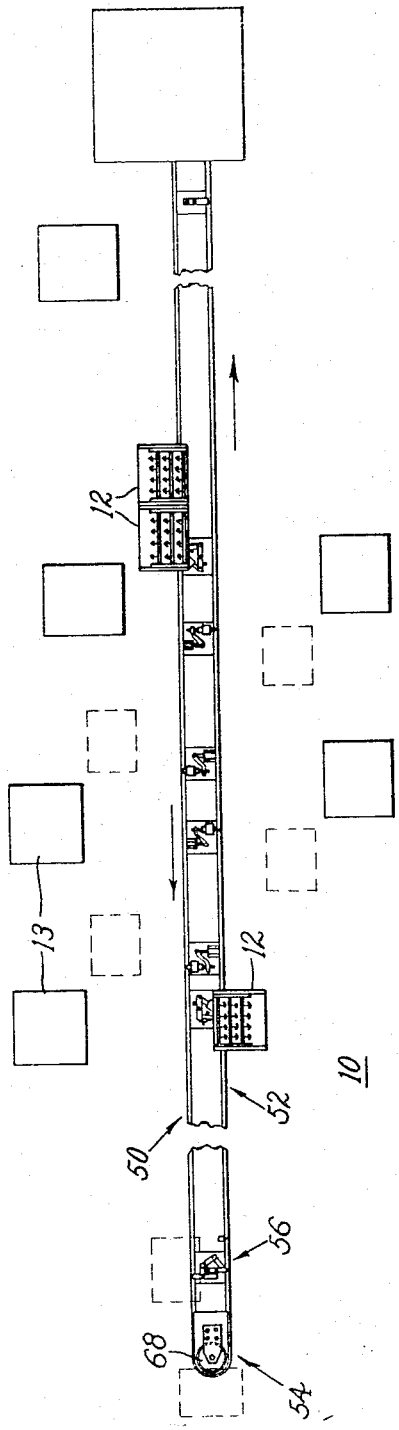

Jan. 10, 1967  E. S. BABSON  3,296,979
CONVEYOR SYSTEMS

Filed Nov. 25, 1964  3 Sheets-Sheet 3

3,296,979
CONVEYOR SYSTEMS
Edward S. Babson, Ipswich, Mass., assignor to United Shoe Machinery Corporation, Flemington, N.J., a corporation of New Jersey
Filed Nov. 25, 1964, Ser. No. 413,756
4 Claims. (Cl. 104—172)

This invention relates generally to conveyor systems in which article carrying racks having friction drive means are moved between work stations disposed on both sides of a double run conveyor or tow chain, and has particular reference to such a system in which novel means is provided for transferring a rack from the end of one run to the beginning of the next run.

In a copending application Serial No. 371,204, filed May 29, 1964, by Donald R. Skeffington, there is disclosed a work handling system of the above described type in which individual racks are each provided with a friction loaded sprocket for engagement with the tow chain, said sprocket being adapted to remain in engagement with the chain during the entire time the rack is disposed in operative relation to the chain.

Installations of the type of conveyor and rack disclosed in the above-identified application usually comprise two parallel runs which travel in opposite directions, and are spaced apart far enough to permit the installation of various rack control mechanisms between the runs. During operation, racks travel in one direction between work stations disposed on one side of the conveyor chain and travel in the opposite direction between work stations on the opposite side of the conveyor chain.

When a rack arrives at the end of the first run, it is necessary to transfer the rack around the end of the conveyor into engagement with the second run. To avoid the necessity of manually disengaging the rack from one side of the conveyor and pushing it around to the other side, it is desirable to provide suitable mechanism for accomplishing such transfer automatically.

In my co-pending application Serial No. 372,059, filed June 2, 1964, there is illustrated a form of transfer device for this purpose, in which means is provided for causing the rack to pivot around the end of the conveyor, while the friction drive sprocket is maintained in engagement with the chain. Although this device has been satisfactory for many applications, it has been found that with this method of driving, although the racks are slowed to a speed less than the chain speed as they commence to pivot around the end of the conveyor, they tend to accelerate as they approach the second run, resulting in excessive centrifugal force which tends to dislodge articles being carried by the rack.

The object of this invention is to provide transfer means for a conveyor system of the type described which is capable of transferring racks from the end of one run of the conveyor to the beginning of another at a speed substantially slower than the speed of the conveyor chain. A further object of the invention is to provide transfer means for the purpose described which prevents the racks from accelerating as they travel around the transfer means.

Other objects of the invention will be apparent to one skilled in the art from the following description of a specific embodiment thereof.

Figure 2:
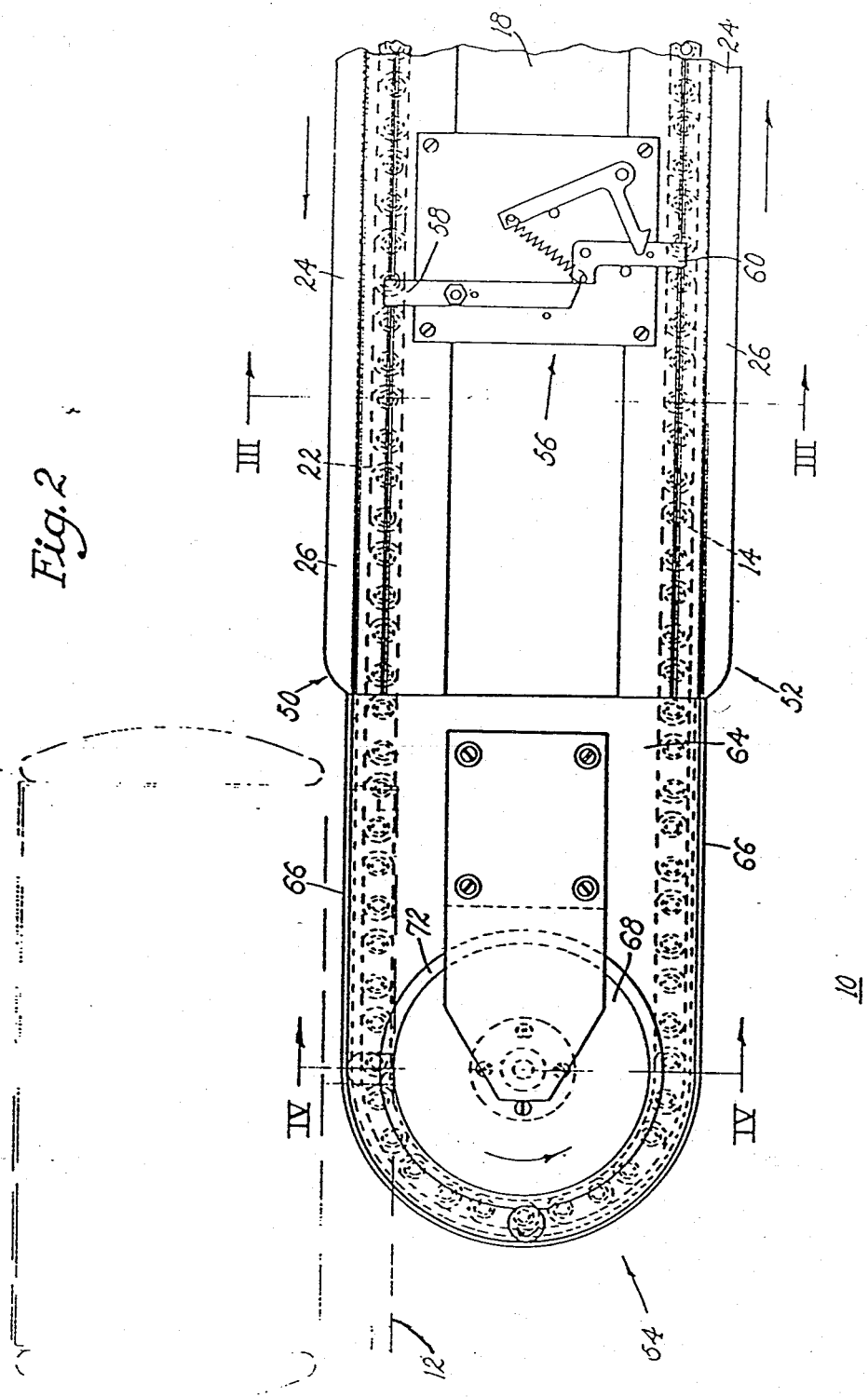
Figure 3:
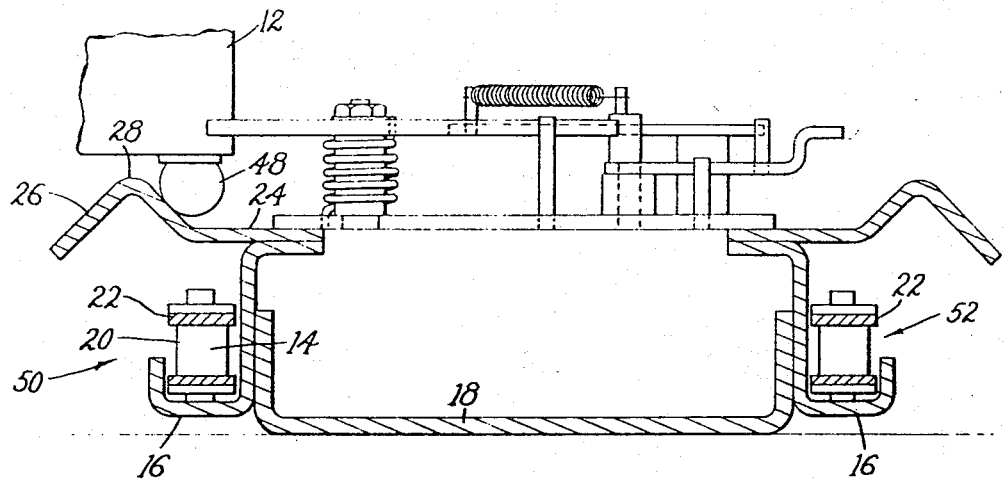
Figure 4:
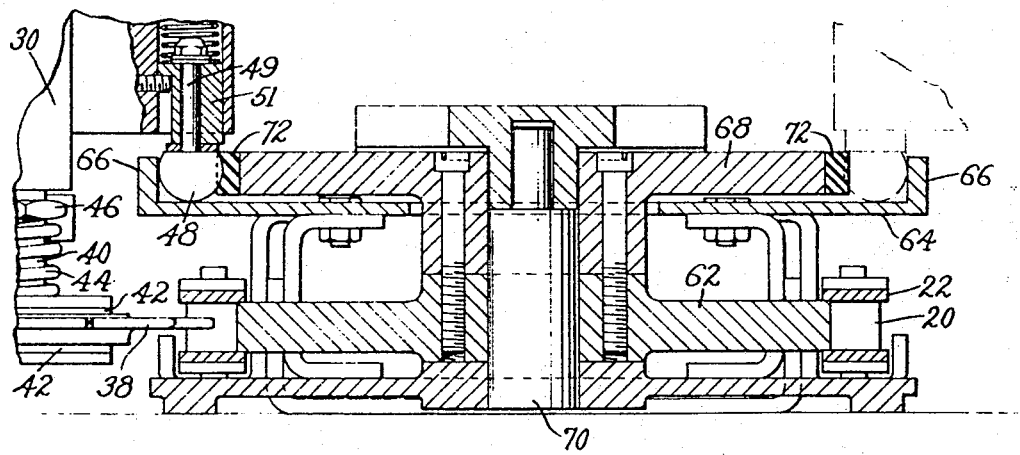

In the drawings,
FIG. 1 is a schematic plan view of a conveyor system embodying the features of the invention;
FIG. 2 is a top plan view of one end of a conveyor system illustrating the transfer means for moving the rack around the end of the conveyor and the means for controlling the entrance of racks into said transfer means;
FIG. 3 is a view in section taken on line III—III of FIG. 2; and
FIG. 4 is a view in section taken on line IV—IV of FIG. 2.

Referring to the drawings there is illustrated a drag line conveyor system which comprises a floor mounted conveyor 10 which is adapted to convey article carrying devices such as racks 12 between various work stations 13. In the illustrated embodiment the conveyor 10 comprises an endless tow chain 14 which travels in a pair of spaced guide channels 16 disposed on opposite sides of a center housing 18. During normal operation of the system the chain is driven continuously in one direction which, in the illustrated embodiment is in the direction of the arrows in FIGS. 1 and 2. The chain is of the type commonly known as roller chain and comprises a series of spaced vertical members 20 retained in position by upper and lower spacing plates 22. To provide means for retaining the rack in operative relation to the conveyor chain a cover 24 is disposed over each run of the chain, the outer edge of each of said covers having a downwardly sloping cam surface 26 leading to a shoulder portion 28 for a purpose to appear hereinafter.

The racks 12 each comprises a base 30 suitably mounted on casters (not shown) to enable the rack to be moved freely in any direction. To provide means for engagement with the conveyor chain, a drive sprocket 38 is mounted below the rack base on a suitable shaft 40. In the illustrated embodiment the drive sprocket is disposed between a pair of friction disks 42, said disks being non-rotatably disposed on the shaft 40 and being urged against the drive sprocket by means of a spring 44 which is maintained under compression by an adjusting nut 46.

To provide means for releasably maintaining the rack in the proper position in relation to the chain 14 so that the sprocket 38 is engaged with the chain, a spring loaded ball detent 48 is mounted on the side of the rack adjacent the chain. The detent 48 is disposed on the end of a shaft 49 which is rotatably mounted in a housing 51 and is positioned at an elevation such that when the rack is moved into operative relation to the conveyor by being pushed sideways toward the tow chain, the detent 48 cams itself up the surface 26 and snaps over the shoulder portion 28 of the chain cover 24.

During normal operation of the conveyor a rack to be transported thereby may be pushed against the conveyor in the manner described so that the sprocket 38 is held in engagement with the continuously moving chain. Since the rack at this instant is stationary the drive sprocket 38 will rotate momentarily at a rate corresponding to the chain speed, and as the force applied thereto by the chain accelerates the rack in the direction of chain motion, the rate of rotation of the sprocket will decrease substantially to zero. When the rack being conveyed reaches a stop mechanism, or collides with a previous rack or with some other obstruction, arresting its forward movement, the drive sprocket, which remains in engagement with the chain, commences to rotate at a speed corresponding to the chain speed. When the stop mechanism is released or the obstruction is removed the frictional resistance of the sprocket will again accelerate the rack to the speed of the chain, with the sprocket rotation decreasing substantially to zero as the rack accelerates.

To control the movement of racks along the conveyor, stop members of various types may be disposed on the center housing 18. A stop member suitable for this purpose is disclosed in my co-opending application Serial No. 371,194, filed May 29, 1964.

In the illustrated embodiment the work stations 13 are positioned along both sides of the conveyor runs. To provide means for automatically moving a rack around the end of the conveyor from the end of the outgoing run 50 to the beginning of the incoming run 52, transfer means 54 and control mechanism 56 are provided at the end of the conveyor opposite the driving means.

The specific form of control mechanism 56 does not constitute part of the present invention and is illustrated herein as being one means of preventing more than one rack at a time from entering the transfer mechanism. The mechanism 56 comprises generally a stop arm 58 positioned to arrest a rack traveling into the transfer mechanism, and an operating arm 60, adapted to release the arm 58 when a rack leaves the transfer mechanism so that the rack waiting at arm 58 can enter the transfer mechanism. The illustrated control mechanism 56 is more fully described and claimed in my co-pending application Serial No. 372,059, filed June 2, 1964.

The transfer mechanism 54 comprises an idler wheel 62 around which the chain extends. Disposed over the wheel 62 and extending a substantial distance toward the opposite end of the conveyor is a cover plate 64. A guide and retaining rim 66 projects upwardly from the outer edge of the cover, said rim along the side edges of the cover, conforming generally to the position of the shoulder 28 on the chain cover 24 and being the same relative distance laterally from the chain around the periphery of the wheel 62.

Disposed within the rim 66 is a drive wheel 68 which is rotatable on a central shaft 70 and is driven by the idler wheel 62, so that the peripheral speed of the wheel 68 is substantially the same as the linear speed of the chain 14.

The drive wheel 68 is provided with a resilient rim portion 72, which is spaced from the curved portion of the rim 66 a distance slightly less than the diameter of the detent 48.

A rack is carried around the end of a conveyor in the following manner. As the rack approaches the transfer device the ball detent passes from the chain cover 24 onto the cover plate 64 behind the retaining rim 66. The rim 66 is sufficiently high that it is capable of preventing outward lateral movement of the ball detent. Hence when the detent reaches the curved portion of the rim opposite the drive wheel 68 it is forced to follow the curvature of the rim and consequently causes the rack to travel around the end of the conveyor from the outgoing run 50 to the incoming run 52.

When the detent 48 reaches the curved portion of the rim it is gripped between the resilient rim 72 of the rotating drive wheel 68 and the retaining rim 66. The detent is thereby rotated by the wheel 68 against the inside surface of the retaining rim whereby said detent is rolled around the inside of the retaining rim at a speed approximately one-half the speed of the chain. The speed of the rack is thereby reduced to approximately one-half its maximum speed as it enters the transfer mechanism. The continuous gripping of the detent throughout approximately the next 180° of the rim insures that the speed of the rack is maintained constant at one-half the maximum speed throughout its travel around the end of the conveyor. During this time the friction drive sprocket 38 is being rotated by the chain at a rate sufficient to compensate for the difference in speed between the chain and the rack. On the discharge side of the transfer means the detent 48 is released from between the drive wheel 68 and the rim 66, whereupon the rack is accelerated back to its maximum speed, with the rate of rotation of the sprocket 38 again decreasing substantially to zero.

Since certain obvious changes may be made in the illustrated device without departing from the scope of the invention, it is intended that all matter contained herein be interpreted in an illustrative and not a limiting sense.

Having thus described my invention, what I claim as new and desire to secure by Letters Patent of the United States is:

1. A transfer mechanism for use with a conveyor system in which an article carrying device is provided with a rotatable guide detent, comprising a guide rim adapted to guide the detent through a predetermined path, and a drive member associated with said guide rim and having a resilient drive surface spaced therefrom so that the detent is resiliently gripped therebetween, and means moving said drive member in relation to said guide rim so that the rotatable detent is rotatably driven along said rim.

2. A conveyor system comprising a tow chain extending around a direction changing wheel to form separate conveyor runs, a guide plate disposed over said chain shaped to provide a guide ridge and a camming surface on both sides of the guide ridge whereby an article carrying device having chain engaging means and spring biased detent means may be engaged and disengaged with the tow chain by lateral movement toward and away from the chain, said guide plate extending over each run and terminating in spaced relation to the wheel, a guide cover disposed over the wheel, said cover having a retaining rim disposed about a portion of the periphery of the wheel, said rim having end portions extending into alinement with the guide ridge at the ends of the guide plate, said retaining rim being shaped to prevent outward lateral movement of the detent means in relation to the rim and being positioned in relation to the wheel to retain the chain engaging means in engagement with the chain, and a drive wheel disposed within said rim, the periphery of the drive wheel being spaced from the rim a distance such that the detent may be gripped therebetween, and means for rotating said drive wheel.

3. A transfer mechanism for use with a conveyor system of the type in which a tow chain is adapted to receive a drive member of an article carrying device to be conveyed thereby and guide means is associated with the chain to releasably engage a guide member on the article carrying device to maintain said drive member in engagement with the chain, said transfer mechanism comprising a direction changing wheel around which the chain travels, a guide member retaining rim disposed around a peripheral portion of the wheel, said guide member retaining rim at the ends being alined with said guide means, said rim being shaped to prevent disengagement of the guide member by outward lateral force applied thereto and being positioned to maintain the drive member in engagement with the chain as it moves about said peripheral portion of the wheel, and a drive wheel disposed within said rim, the periphery of said drive wheel being spaced from said rim an appropriate distance to grip said rotatable guide member therebetween, and means for rotating said drive wheel with said direction changing wheel whereby a guide member gripped between said drive wheel and the rim is rotatably driven against the rim to travel around the periphery of the drive wheel to pull the article carrying device around the direction changing wheel.

4. A transfer mechanism for use with a conveyor system of the type in which a tow chain is adapted to receive a friction drive wheel of an article carrying device to be conveyed thereby and the article carrying device is provided with guide means adapted for releasable engagement with a guide rail associated with the chain, said transfer mechanism comprising a direction changing wheel around which the chain travels, a guide rim disposed around a portion of the periphery of the wheel, said guide rim at the ends being alined with the ends of the guide rail and being spaced laterally from the chain about said peripheral portion of the wheel a distance substantially equal to the spacing of the guide rail from the chain, said rim being shaped to prevent disengagement of the guide means therefrom by radial forces applied to the article carrying device, and a drive wheel disposed within said rim, the periphery of said drive wheel being resilient and being spaced from the rim a distance slightly less than the diameter of the rotatable guide means, said wheel being rotatable with said direction changing wheel.

No references cited.

ARTHUR L. LA POINT, *Primary Examiner.*

D. F. WORTH, *Assistant Examiner.*